United States Patent [19]

Bendler et al.

[11] 4,081,964

[45] * Apr. 4, 1978

[54] APPARATUS FOR THE THERMAL AND ELECTRICAL INITIATION OF FIRE PROTECTION DEVICES

[75] Inventors: Hellmut Bendler, Furth-Dammbach; Anton Bretfeld, Nuremberg, both of Germany

[73] Assignee: Dynamit Nobel Aktiengesellschaft, Germany

[ * ] Notice: The portion of the term of this patent subsequent to Aug. 23, 1994, has been disclaimed.

[21] Appl. No.: 701,810

[22] Filed: Jul. 1, 1976

Related U.S. Application Data

[63] Continuation-in-part of Ser. No. 662,290, Feb. 27, 1976, Pat. No. 4,043,128.

[30] Foreign Application Priority Data

Jul. 4, 1975 Germany ............................ 2529838

[51] Int. Cl.[2] ........................ F15B 15/06; F15B 15/14; F16K 17/40

[52] U.S. Cl. .................................. 60/636; 137/68 A; 60/632; 169/56; 98/86; 52/1; 49/7

[58] Field of Search .................................. 60/632–637; 169/56–61, 42, 154; 137/68 A, 68 R; 98/86, 29; 52/1; 49/7

[56] References Cited

U.S. PATENT DOCUMENTS

| | | | |
|---|---|---|---|
| 1,914,250 | 6/1933 | Gillen | 60/632 |
| 3,242,666 | 3/1966 | Peterson | 60/636 |
| 3,354,634 | 11/1967 | McGirk | 60/632 |
| 3,858,392 | 1/1975 | Evans et al. | 60/632 X |

FOREIGN PATENT DOCUMENTS

| | | | |
|---|---|---|---|
| 2,246,791 | 6/1975 | France | 137/68 A |
| 2,146,839 | 3/1973 | Germany | 169/58 |
| 1,309,846 | 3/1973 | United Kingdom | 60/632 |

*Primary Examiner*—Wendell E. Burns
*Attorney, Agent, or Firm*—Craig & Antonelli

[57] ABSTRACT

Apparatus for the thermal and electrical initiation of fire protection devices including a housing with a displaceable support member and an abutment member provided therein. A blocking or spacing device is disposed between the displaceable support member and the abutment member with the displaceable supports member being biased against said blocking device in the direction toward the abutment member. The blocking device is responsive to the exceeding of a predetermined temperature for enabling displacement of the displaceable support member for initiating a fire protection device. The abutment member is constructed as a plunger displaceable within the housing in the direction towards the displaceable support member, and an electrically actuatable compressed-gas-generating igniter device is disposed on the side of the plunger facing away from the blocking device for producing compressed gas to cause displacement of the plunger toward the blocking device.

16 Claims, 1 Drawing Figure

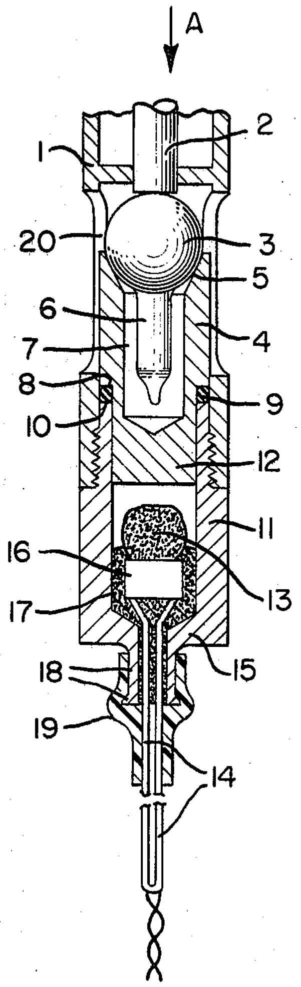
A
1
2
20
3
5
6
4
7
8
9
10
12
11
16
13
17
15
18
19
14
14

APPARATUS FOR THE THERMAL AND ELECTRICAL INITIATION OF FIRE PROTECTION DEVICES

This is a Continuation-In-Part application of application Ser. No. 662,290 filed Feb. 27, 1976 now U.S. Pat. No. 4,043,128.

The present invention relates to a triggering apparatus utilizable for thermal and/or electrical initiation of fire protection devices.

Heat-sensitive triggering devices for fire protection systems, e.g. fire alarm and/or extinguishing units in warehouses, storage sheds, workshops, or the like, are known which are fashioned as sealed glass ampoules filled to a greater or lesser extent with alcohol or a similar fluid. The glass ampoule having, for example, essentially the shape of a sphere, is clamped between an axially displaceable support and a fixed abutment within a housing and serves as a blocking element for the displaceable support. The axially displaceable support is fashioned, for example, as a pin displaceable in the direction toward the abutment under the force of a biased spring constantly effective on the pin, whereas the abutment is, for instance, a cylindrical sleeve fixedly arranged in the housing and receiving the spur portion of the glass ampoule. In case of ambient temperatures of, for example, 60°, 70°, or 80° C. of prolonged duration, the glass ampoule is destroyed by expansion and/or evaporation of the liquid, so that the blockage of the displaceable pin is released, and the latter can then move axially and thus effect a mechanical switching process which, in turn, triggers the fire alarm or extinguishing units, the smoke exhaust systems, or the like.

In order to attain also an intentional initiation in these arrangements, for example to start the operation of an extinguishing system for precautionary purposes in a part of the building in the proximity to the actual source of the fire, it is known to provide these glass ampoules with a separate accessory part comprising an electrically triggered compressed-gas cartridge and a projectile-like safety seal. In case of an intentional initiation, the safety seal is driven from the side into the glass ampoule, so that the latter is destroyed and thus the mechanical switching step is triggered as described above. One disadvantage in this connection is the high manufacturing expenses due to the separate design and mounting of the laterally arranged electrical destruction means. Besides the servicing of these devices is cumbersome and accordingly expensive, inasmuch as it is necessary, after the test initiations required for safety reasons in certain intervals, to replace not only the glass ampoule but also the separately arranged destruction units.

It is therefore an object of the present invention to overcome the aforementioned disadvantages and to construct the apparatus for the thermal and electrical initiation of fire protection devices so that it is of a maximally simple and compact structure, requires only minor expenditures for assembly and operation, and is maximally insensitive to disturbances from the surroundings.

According to the present invention there is provided an apparatus for the thermal and electrical initiation of fire protection devices including a housing with a displaceable support and abutment provided therein. A spacer or blocking element is arranged between the displaceable support and abutment which permits the support to be displaced in the direction toward the abutment under the action of a force constantly effective thereon, when a predetermined temperature has been reached. Additionally, the housing is provided with an accessory device which can be triggered electrically. The abutment is preferably fashioned as a plunger or piston member displaceable within the housing in the direction toward the support thereby eliminating the blocking effect of the spacer element on the support and the accessory device is in the form of a compressed-gas-generating igniter device, which can be initiated electrically and is disposed on the side of the plunger facing away from the spacer or blocking element.

In accordance with a feature of the present invention, the abutment is utilized simultaneously for changing, at a predetermined point in time, the temperature-sensitive spacer element in its configuration and/or to remove this element from its position wherein it arrests or blocks the opposed, displaceable support, so that the latter is released and can initiate the intended switching procedure.

Preferably, for electrical initiation an electrical igniter element with an incandescent filament is provided as an igniting means which produces compressed gas to which the abutment is responsive to changing the configuration or removal of the spacer or blocking element. However, it is of course, also possible to utilize a different-type electrical igniter means, for example a gap or layer igniter. Normally, the amount of gas produced by these igniting means is entirely sufficient in order to displace the plunger-like abutment guided in the housing in the desired manner with respect to the spacer or blocking element. Insofar as this should prove advantageous under adverse circumstances, however, it is also possible to arrange after the igniter means furthermore a special igniting charge which produces compressed gas. In any event, a small, compact structural component is obtained without any laterally arranged accessories, which component can be manufactured inexpensively and is simple to service with a high degree of operating safety, since, for example, it is possible to insert simultaneously with the insertion of a new spacer element into the housing, necessary after test initiations, also a new compressed-gas-generating igniter means in a simple manner, the abutment generally being reusable.

The temperature-sensitive spacer element can be made, for example, in the form of a rod-shaped member of defined dimensions from a metal melting when a predetermined temperature has been reached and/or from an appropriate metal alloy, e.g. Wood's alloy. The temperature-dependent initiation is then accomplished by melting the spacer element either partially or entirely when the limit temperature has been reached and maintained for a longer period of time or when such limit temperature has been exceeded. In this way, the spacer or blocking element under the pressure of the preferably spring-loaded, displaceable support, changes its shape and/or is removed from its locking position so that the support can shift axially and thus trigger the switching operation.

With a view toward a still further simplified assembly and servicing operation, a construction has proven to be advantageous wherein preferably the electrical igniter means is firmly inserted in a locking element fashioned in a manner similar to a screw cap, so that after an electrical initiation the original locking element can be simply replaced by a new locking element having a not yet initiated igniter means.

To provide that the plunger, in the rest condition, can serve as a fixed abutment for the spacer or blocking element, it is possible to hold the plunger in the housing by way of radial shear pins or the like which are severed only after the compressed-gas-generating igniter means has been electrically triggered. However, it is more advantageous, in accordance with a further suggestion of this invention, to fashion the plunger and the housing with an offset portion preferably constructed as a continuous radial shoulder.

According to a further feature of the present invention, the locking element is preferably threadedly inserted in the tubular housing of the apparatus of this invention such that the locking element contacts the plunger with its end face and holds the plunger in the predetermined rest position.

In order to reliably protect the igniter means, even under adverse circumstances, from disadvantageous environmental influences, especially moisture, special sealing means can be additionally provided. For example, a sealing ring of an elastic material can be clamped between the end face of the locking element and the plunger. In the zone of the single electrical lead, or the two electric leads, for the igniter means, which must be introduced into the housing from the outside, this can be effected, for example, with a sealing compound, especially a bicomponent adhesive, such as is commercially available, for instance, under the name of "ARALDITE". This sealing compound can advantageously serve, at the same time, for mounting the igniter means directly within the housing, i.e. not only by way of its wire leads.

An especially advantageous construction of the spacer or blocking element used together with the abutment, which latter is fashioned as a plunger, is in the form of a glass vessel or ampoule. These substantially spherical, liquid-filled glass ampoules, which are known and commercially available, for example, under the designation of "ESTI" cartridges, can be manufactured with little expense and react relatively rapidly to small excesses of the predetermined limit temperature. In this connection, care must be taken by a particular construction of the housing receiving such cartridge, preferably by the provision of correspondingly large window-like apertures, that the glass fragments produced during the destruction of the cartridge do not unduly impede the functions, i.e. especially the axial movement, of the displaceable support.

These and other objects, features and advantages of the present invention will become more apparent from the following description when taken in connection with the accompanying single figure of drawing.

Referring now to the single feature of the drawing, there is shown in a longitudinal sectional view, a cylindrical housing which is preferably of a rustproof metal, e.g. brass, and a pin 2 arranged as a displaceable support. The pin is pressed against the spacer or blocking element 3 under the force of a biased coil spring, not shown, in the direction of arrow A. The pin 2 is connected, with its other end, not shown, with a switch arrangement which triggers, for example, the fire alarm upon displacement of the pin. The spacer or blocking element 3, shown in an elevational view, is fashioned as an alcohol-filled spherical glass ampoule which is supported under the pressure action of the pin 2 against an abutment 4, fashioned as a plunger, by way of an inner cone 5 of the plunger. The glass ampoule 3 is provided with a stem or spur portion 6 which extends into a blind bore 7 of the plunger 4. The plunger, in turn, is supported with an offset portion 8, fashioned as a radial continuous annular shoulder, on an end face 10 of a cap-like closing or locking element 11, with a sealing ring 9 of rubber being interposed therebetween.

The cap-like locking element 11 is threadedly inserted in the housing 1. The plunger 4 is provided with an extension 12 of reduced diameter extending from the offset portion 8, within the tubular part of the locking element 11. In the locking element, an electrically initiated igniter device 13 is arranged which is illustrated as an igniter element with an incandescent wire. The two wire leads 14 of this igniter device are extended through the bottom 15 of the locking element 11. The igniter device 13 and/or its holder 16 formed of an electrically insulating material are held in the locking element 11 by a sealing compound 17, thus providing simultaneously a seal in the zone of the opening required in the bottom 15 for the wire leads. If particularly high requirements must be met by the seal and for the protection of the wires 14 extended from the locking element 11, it is possible — as illustrated — to provide the bottom 15 of the locking element 11 on its outside with a collar-type flaring portion 18 on which a hose 19, e.g. of polyethylene, is shrink-fitted under heat. The hose also surrounds the wires 14 along a certain length. In the region of the spacer element 3, the housing 1 has lateral apertures 20, illustrated as two oppositely disposed windows, which make it possible for the splinters of the destroyed glass ampoule to fall out of the housing 1.

The apparatus functions as follows: At a predetermined temperature, e.g. 70° C., the glass ampoule is destroyed by the increased vapor pressure of the alcohol filling. Thereupon, the ampoule releases the pin 2 which moves in the direction of arrow A and triggers the switching arrangement. In case of an intentional initiation at below this limit temperature, an electric voltage is applied to the wire leads 14 so that the igniter device 13 is ignited. The thus-formed gases are effective on the bottom of the plunger 14 and/or the extension 12 which is guided with such a minor radial play within the housing 1 and/or in the locking element 11 that the flawless advancement of the plunger 4 and thus the destruction of the glass ampoule by gases flowing laterally to the outside is not impaired. The fragments of the glass ampoule fall through the openings 20 toward the outside and/or into the blind bore 7 of the plunger 4, so that the pin 2 also in this case is capable of initiating the desired switching operation by displacement in the direction of arrow A.

The igniter device is preferably fashioned as a conventional bridge igniter with incandescent wire, which device can be initiated at an internal resistance of about 1–2 Ω by means of an electrical current of about 0.8A. The igniter composition producing the compressed gas is applied to the incandescent wire in an amount of about 50–70 mg. The igniter means can be supplied from the electric mains, but also by way of an emergency power or current unit and/or a battery, with the required electric energy. The readiness for functioning of the electrical initiating system can be controlled without difficulties, since the electric circuit does not contain any contacts which close only on account of the actual initiation. Testing is accomplished in a simple manner by determining the electric resistance of the circuit, wherein the amperage of the measuring or static current is to be dimensioned to be so small, for example 1–10 mA, that the igniter device is not initiated during testing.

While we have shown and described a single embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for the thermal and electrical initiation of fire protection devices comprising a housing with a displaceable support member and an abutment means provided therein, blocking means being disposed between said displaceable support member and said abutment means, said displaceable support member being biased against said blocking means in the direction toward said abutment means, said blocking means being responsive to the exceeding of a predetermined temperature for enabling displacement of said displaceable support member for initiating a fire protection device, said abutment means being constructed as a plunger means displaceable within said housing in the direction towards said displaceable support means, and an electrically actuatable compressed-gas-generating igniter means being disposed on the side of the plunger means facing away from said blocking means for producing compressed gas to cause displacement of said plunger means toward said blocking means, said electrically actuatable igniter means including at least one electrical lead extending outwardly from said housing, and further comprising means for sealing at least the housing in the zone of the plunger means and said at least one electrical lead from outside influences.

2. Apparatus according to claim 1, wherein said blocking means is responsive to displacement of said plunger means for at least one of changing the shape thereof and removal thereof from the blocking position so as to permit displacement of said displaceable support means in the direction toward said plunger means for initiating a fire protection device.

3. Apparatus according to claim 1, further comprising a cap-like locking means for receiving the electrically actuatable igniter means therein, said locking means being connected with said housing so that said at least one electrical lead extends outwardly therefrom, said plunger means having an end portion facing away from the blocking means guided for movement within said locking means.

4. Apparatus according to claim 3, wherein said locking means and said housing are cylindrical members and said plunger means is a cylindrical member, said locking means being threadedly secured to said cylindrical housing.

5. Apparatus according to claim 1, wherein said plunger means is provided with a cylindrical outer surface having an offset annular shoulder portion, said annular shoulder being supported on a counter surface of said housing in the direction toward said electrically actuatable igniter means.

6. Apparatus according to claim 3, wherein said plunger means is provided with a cylindrical outer surface having an offset annular shoulder portion, said locking means being provided with an annular end face disposed within said housing, said annular shoulder of said plunger means being supported on said annular end face of said locking means in the direction toward said electrically actuatable igniter means.

7. Apparatus for the thermal and electrical initiation of fire protection devices comprising a housing with a displaceable support member and an abutment means provided therein, blocking means being disposed between said displaceable support member and said abutment means, said displaceable support member being biased against said blocking means in the direction toward said abutment means, said blocking means being responsive to the exceeding of a predetermined temperature for enabling displacement of said displaceable support member for initiating a fire protection device, said abutment means being constructed as a plunger means displaceable within said housing in the direction towards said displaceable support means, and an electrically actuatable compressed-gas-generating igniter means being disposed on the side of the plunger means facing away from said blocking means for producing compressed gas to cause displacement of said plunger means toward said blocking means, a cap-like locking means for receiving the electrically actuatable igniter means therein, said locking means being connected with said housing, said plunger means having an end portion facing away from the blocking means guided for movement within said locking means, said igniter means including at least one electrical lead extending outwardly from one of said housing and said locking means, and further comprising means for sealing at least one of said housing and said locking means in the zone of said plunger means and in the zone of said at least one electrical lead from outside influences.

8. Apparatus according to claim 7, wherein said means for sealing includes a sealing ring disposed between a counter surface of at least one of said housing and said locking means and an offset annular shoulder portion of said plunger means for sealing in the zone of said plunger means, and a sealing material disposed in the zone of said at least one electrical lead.

9. Apparatus according to claim 8, wherein said sealing material includes a sealing compound within one of the housing and locking means and a hose member extending over at least one of said housing and said locking means in the zone of at least a portion of said at least one electrical lead.

10. Apparatus according to claim 1, wherein said blocking means is a container with a fluid filling for destroying the container upon exceeding the predetermined temperature.

11. Apparatus according to claim 10, wherein said container is a glass vessel.

12. Apparatus according to claim 7, wherein said blocking means is a container with a fluid filling for destroying the container upon exceeding the predetermined temperature.

13. Apparatus according to claim 6, wherein said means for sealing includes a sealing ring disposed between the annular end face of said locking means and said annular shoulder portion of said plunger means for sealing in the zone of said plunger means, and a sealing material disposed in the zone of said at least one electrical lead.

14. Apparatus according to claim 13, wherein said sealing material includes a sealing compound within one of the housing and locking means and a hose member extending over at least one of said housing and said locking means in the zone of at least a portion of said at least one electrical lead.

15. Apparatus according to claim 14, wherein said blocking means is a container with a fluid filling for destroying the container upon exceeding the predetermined temperature.

16. Apparatus according to claim 15, wherein said container is a glass vessel.

* * * * *